United States Patent [19]

Wilkinson

[11] 4,407,131

[45] Oct. 4, 1983

[54] COGENERATION ENERGY BALANCING SYSTEM

[75] Inventor: William H. Wilkinson, Columbus, Ohio

[73] Assignee: Battelle Development Corporation, Columbus, Ohio

[21] Appl. No.: 177,680

[22] Filed: Aug. 13, 1980

[51] Int. Cl.$^3$ .............................................. F01K 17/06
[52] U.S. Cl. ...................................... 60/648; 60/677; 60/652
[58] Field of Search ................. 60/648, 677, 652, 659; 236/12.1

[56] References Cited

U.S. PATENT DOCUMENTS

| | | | |
|---|---|---|---|
| 1,066,348 | 7/1913 | Voorhees | 60/649 UX |
| 3,391,539 | 7/1968 | Dimitroff, Jr. | 60/648 X |
| 4,042,809 | 8/1977 | Shetler | 60/648 X |
| 4,089,186 | 5/1978 | Rojey et al. | |
| 4,094,355 | 6/1978 | Blytas | |
| 4,102,388 | 7/1978 | Blytas | |
| 4,167,101 | 9/1979 | Rojey | |

OTHER PUBLICATIONS

Cohen et al., "A New Absorption-Cycle Process for Upgrading Waste Heat", *American Chemical Society*, (1979).
Cohen et al., "Valorisation de Calories a Bas Niveau Au Moyen de Cycles Trithermes", Entropie, No. 84, (Nov.-Dec. 1978) & Updated Publication, Upgrading Thermal Wastes in Industry IFP Thermosorb Process.
Takaaka, "Large Heat Pumps & Exhaust Heat Recovery", *Refrigeration & Air Conditioning*, vol. 26, No. 310, 12-19-75.
Wade et al., "Low Temperature Solar Industrial Cooling System", *Proceedings-Institute of Environmental Sciences*, (date unknown).
Williams et al., "A Heat Pump Powered by Nautical Thermal Gradients", presented at 9th IECE Conference, Aug. 26-30, 1974.

*Primary Examiner*—Allen M. Ostrager
*Attorney, Agent, or Firm*—Biebel, French and Nauman

[57] ABSTRACT

A system is provided which improves the ability of cogeneration facilities to meet varying electrical power and process steam demands. One or more thermal boosting systems each having a Rankine cycle evaporator coupled with a solution heat pump cycle is integrated with the turbines of the cogeneration facility to maintain full steam flow through the turbines and provide a portion of the process steam demands on the facility. Optionally, a bottoming turbine is added to the system to further improve its flexibility to meet varying demands.

25 Claims, 3 Drawing Figures

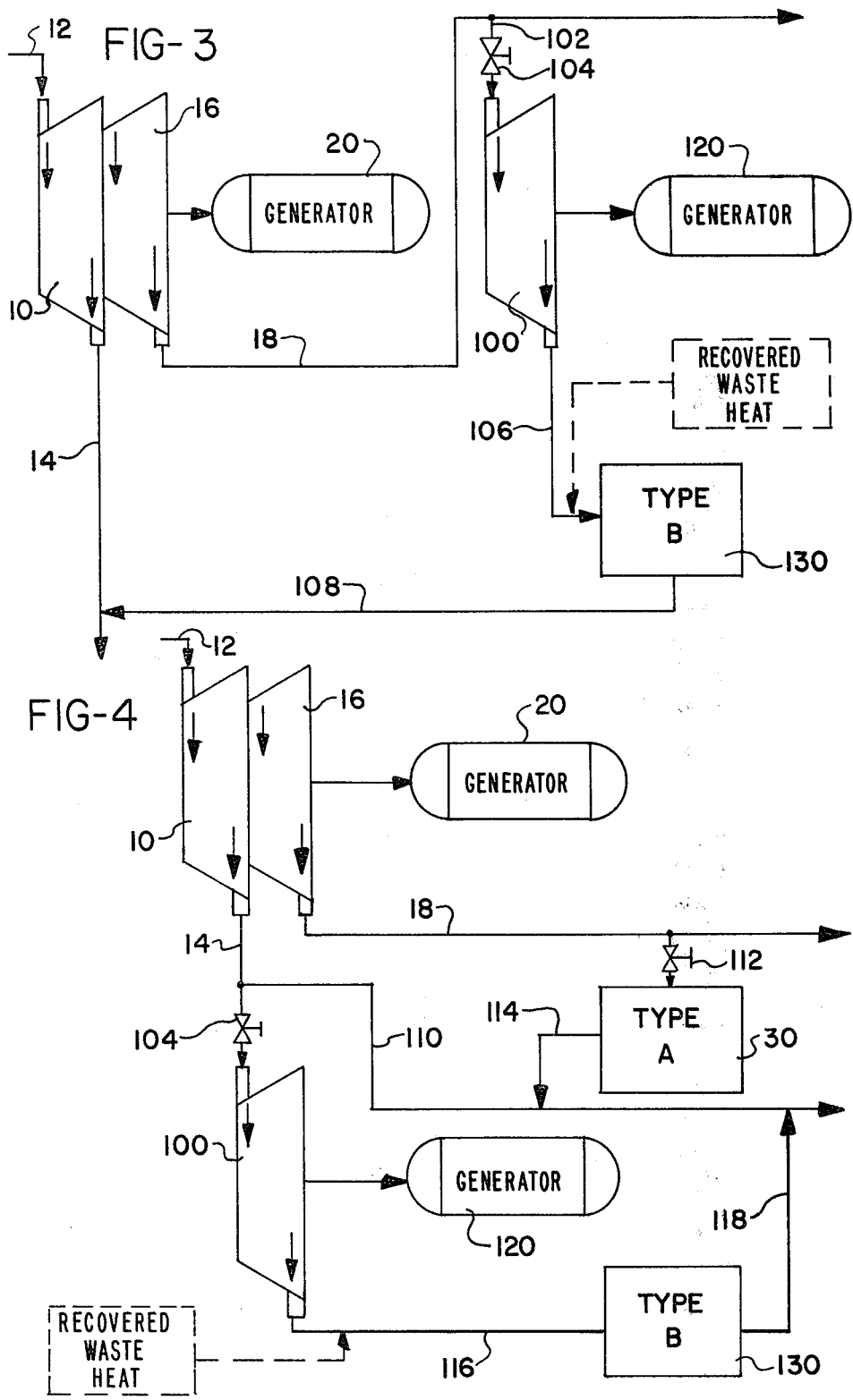

COGENERATION ENERGY BALANCING SYSTEM

BACKGROUND OF THE INVENTION

This invention relates to a process and system for improving the ability of a cogeneration facility to meet changing power and heat demands, and more particularly to the use of a thermal boost system in combination with a cogeneration facility to achieve control over varying power and process steam demands.

Many large industrial plants generate both their power and heat requirements on site. In a typical system, fuel is burned in boilers to produce steam which is then expanded through one or more turbines to create shaft work. This shaft work can then be used to generate electricity to meet the power needs of the facility. One or more portions of steam are extracted from the turbines at desired pressures to meet the heat and process steam requirements of the facility.

The turbines in such facilities are designed and built to meet specific power and heat requirements, and, when there is a variation in those requirements, significant efficiencies of operation are lost. For example, when the need for steam in a plant is reduced through energy conservation measures or because of a cyclic reduction in demand for process steam, it is often preferred to reduce the amount of steam generated at the boilers to match.

The resulting reduced steam flow through the turbines, however, reduces the power generated and requires the purchase of electrical power from an external source such as a local utility. If this is undesirable because of high costs or unavailability, then steam flow must be maintained to meet power needs. The excess steam can be vented although this results in a waste of the cost of the fuel needed to generate it. Alternatively, the excess steam can be further expanded through middle and/or low pressure turbines to produce more shaft work for power generation. However, further expansion may cause wetness problems and excessive wear on turbine blades requiring the separation and extraction of liquid. Moreover, design and fabrication of the turbine becomes progressively more difficult because of the low density of the steam at lower pressures. Neither of the above alternatives has proven to be satisfactory for cogeneration applications.

Accordingly, the need exists in the art for a process and system which allows for more efficient and flexible utilization and control of the power and steam produced by a cogeneration facility in response to varying power and process steam demands.

SUMMARY OF THE INVENTION

The present invention meets that need by providing a process and system which utilizes the excess steam generation capacity of a cogeneration system to permit a greater portion of the steam to be used for power generation. Such a system can easily be retrofitted onto existing cogeneration facilities where conservation efforts have decreased the need for process steam or where there is a need for greater system flexibility to meet varying power and heat requirements.

In a typical cogeneration system, the turbine utilized has one or more extraction stages from which process steam is obtained at the pressures required for the particular plant operation. Alternatively, a plurality of turbines operating at different pressures may be utilized. For the purposes of this specification, reference to a single turbine having a plurality of extraction stages is intended to include the alternative of a plurality of turbines operating at different pressures. In a typical cogeneration facility there will be a variable admission high pressure turbine stage coupled with a full admission low pressure turbine stage, although other intermediate pressure stages may be present. For example, steam at an initial pressure of from 600–650 psia may be available from the fueled boilers and can be extracted from the high pressure stage at, for example, 165 psia and from the low pressure stage at, for example, 65 psia. Of course, steam may be extracted at one or more pressures depending upon the specific needs of the facility.

Efficient control of the high pressure turbine stage is accomplished by varying the number of admission nozzles used permitting control of the 165 psia extraction pressure in response to varying process demands. No direct control of the low pressure stage is generally provided so that the turbine back pressure is established by the 65 psia steam demand. Since the low pressure turbine stage acts like a constant area orifice to the high pressure stage, the nominal 65 psia process steam demand sets the turbine back pressure, raising it as the low pressure process steam demand in the plant is reduced. This back pressure acts like a throttle for the low pressure turbine discharge and causes a loss in power output from that stage both because of the reduced throughput of steam and because of the reduced expansion ratio from high to low pressure stages. Consequently, energy conservation measures that reduce the need for steam cause an exaggerated reduction in power generation and idle a significant amount of the installed plant power producing capability.

The system of the present invention permits full restoration of the full steam flow through the low pressure turbine stage and increases the flow of steam through the high pressure turbine stage without affecting the operation or control of the turbine. Moreover, for each pound of steam entering the first turbine stage that is not used for process heat the system increases the work extracted from that steam and, in some instances, eliminates the need for turbine expansion to pressures below the lowest process steam needs of the plant, thereby minimizing turbine wetness problems.

In one embodiment of the invention, a thermal boosting system which includes a Rankine cycle evaporator in conjunction with an absorption heat pump accepts, for example, the excess 65 psia steam no longer required in the plant and generates 165 psia process steam from it. The generated 165 psia process steam can be used to reduce the amount of steam extracted from the high pressure turbine stage so that an increased amount of shaft work can be produced by the turbine.

This significantly increases the power to heat ratio generated by the system and permits it to provide for the power requirements of the plant even though heat requirements have dropped. Moreover, the thermal boosting system can be adjusted readily to meet varying process steam demands. Additionally, frequently low pressure process steam sources available in the plant that would otherwise have to be disposed of as waste heat can be used in the system.

In another embodiment of the invention where turbine wetness is not a problem at lower steam pressures, low pressure process steam, such as 65 psia steam, can be extracted from the high pressure turbine stage while the back pressure steam from the low pressure turbine stage is used to drive a thermal boost system to generate the high pressure process steam requirements for the plant at, for example, 165 psia. In addition, waste heat sources available from within the plant can be utilized to supplement the back pressure steam to drive the boost system.

In yet another embodiment of the invention, an extra bottoming turbine stage may be added to the system which generates power and then discharges low pressure steam to a thermal boost system. The low pressure system is upgraded by the thermal booster to provide a portion of the high pressure steam requirements of the plant. Additionally, a second thermal booster can utilize some of the process steam discharged from the low pressure turbine stage and upgrade a portion of that steam to provide high pressure steam for the plant. Waste heat recovered from other locations in the plant can be supplied to either of the thermal boosters to complete the power and process steam generation system. The system is independently controllable and adaptable to meet varying power and process steam requirements and may incorporate additional boosters.

Accordingly, it is an object of the present invention to provide a process and system which permits efficient and flexible utilization and control of power and process steam generation in an industrial plant in response to varying needs. This and other objects and advantages of the invention will be apparent from the following description, the accompanying drawings, and the appended claims.

BRIEF DESCRIPTION OF THE DRAWINGS

FIG. 3 is a schematic illustration of another embodiment of the present invention including a bottoming turbine stage; and FIG. 4 is a schematic illustration of yet another embodiment of the present invention including a bottoming turbine stage and a pair of thermal boosting systems.

DESCRIPTION OF THE PREFERRED EMBODIMENTS

As discussed above, in many instances conservation measures in industrial plants reduce the need for process steam in the plant which in turn requires either that excess steam production be vented and wasted or that steam generation for the plant be reduced. However, a reduction in steam generation has the undesirable effects of reducing electrical power generation and forcing the purchase of power from an outside source. The disclosed embodiments of the present invention are designed to restore lost steam flow to the turbines and increase the ratio of power produced for each unit of process heat delivered to the turbines.

Figure 1:
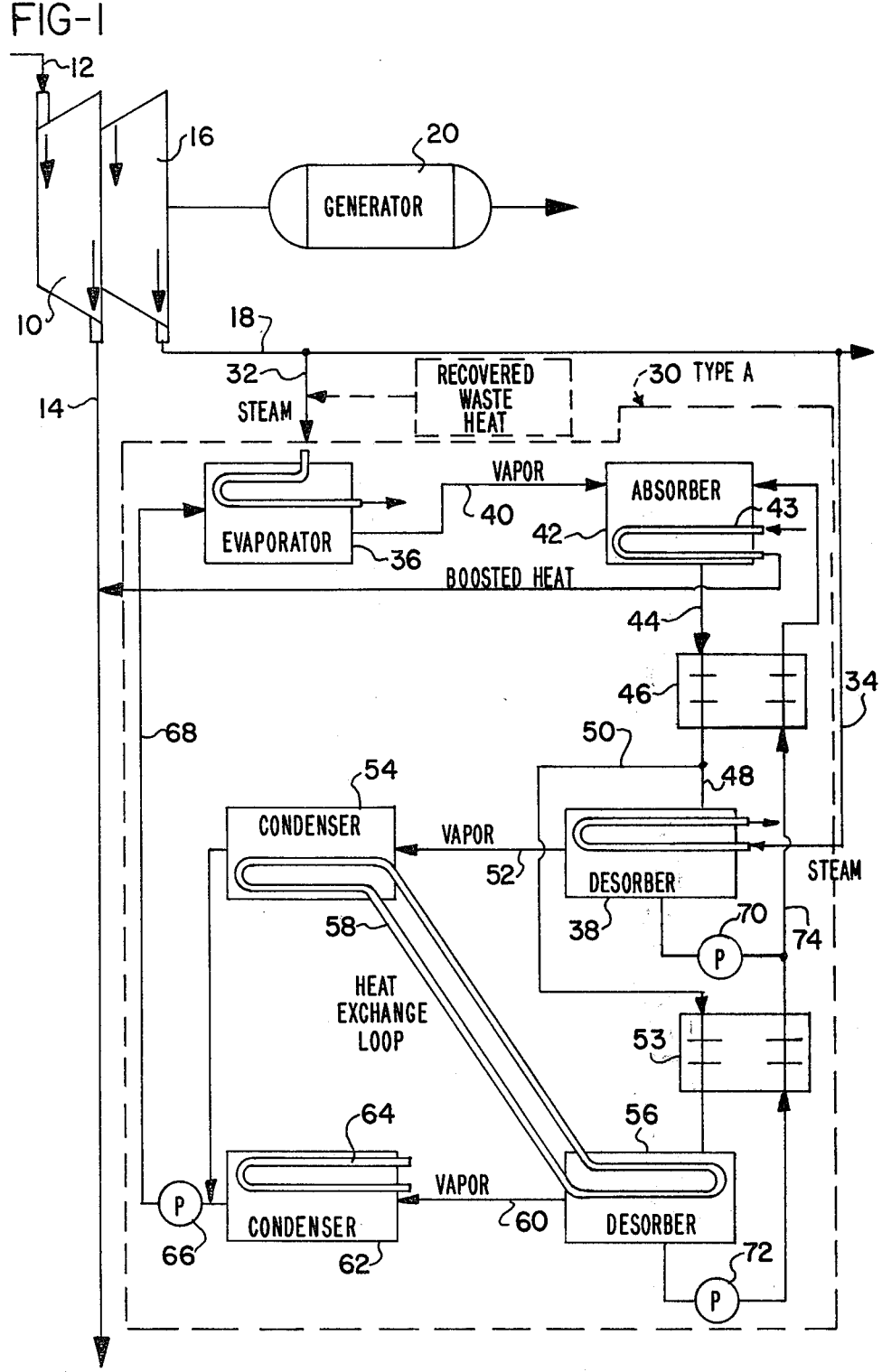
FIG. 1 is a schematic illustration of the basic components of one embodiment of the present invention including a turbine cogeneration facility in combination with a thermal boosting system.

The embodiment of the present invention illustrated in FIG. 1 is designed to be utilized when demands for low pressure process steam in a plant have been decreased. As illustrated, superheated high pressure steam (e.g., steam at 600–650 psia) from fueled boilers (not shown) enters high pressure turbine stage 10 through line 12. As designed, an amount of high pressure (e.g., steam at 165 psia) steam $W_1$ required for process needs in the plant is extracted through line 14 while the remainder of the partially expanded steam enters low pressure turbine stage 16. As designed, after further expansion, the remaining low pressure (e.g., steam at 65 psia) steam $W_2$ exits turbine stage 16 through line 18 and is piped to where it is required in the plant to meet process needs. The shaft work done by the expansion of the steam through the turbine stage is used to generate electrical power in generator 20.

If, through conservation measures or otherwise, the demand for low pressure process steam is decreased by an amount X, then, typically, steam flow through the turbines would also have to be reduced. The thermal boosting system of the present invention permits the restoration of the full designed steam flow through the low pressure turbine stage and increases the flow of steam through the high pressure stage without affecting previously installed turbine controls.

This is accomplished by flowing the full design amount of steam $W_2$ through the low pressure stage and diverting an amount of steam equal to X from line 18 to thermal boost system 30 (shown within dashed line box), where $X = aW_3$ and a is the reciprocal of the coefficient of performance of the thermal boost system. Boost system 30, which for purposes of this invention will be termed a Type A boost system, provides an amount of high pressure steam $W_3$ for high pressure process steam needs permitting the amount of high pressure steam extracted from high pressure turbine stage 10 to be reduced by the amount $W_3$. This, in turn, increases the amount of steam flowing through turbine stage 10 by an amount $(a-1)W_3$. The amount of steam generated by the fueled boiler also increases by this lesser amount, $(a-1)W_3$, generating an increased shaft work output from the turbines from the extra steam flow.

Referring to FIG. 1, excess low pressure steam enters thermal boost system 30 through lines 32 and 34. The steam supplies the heat needed to evaporate refrigerant in evaporator 36 and desorb refrigerant as vapor from the absorbent-refrigerant solution in desorber 38. Thermal boost system 30 can be operated using any known refrigerant-absorbent pair although it is preferred that a lithium bromide absorbent, water refrigerant pair be utilized.

Steam from line 32 evaporates at least a portion of the liquid refrigerant in evaporator 36 and produces a relatively high pressure vapor which is passed via line 40 to absorber 42. In absorber 42, which is also maintained at the same relatively high pressure as evaporator 36, an absorbent-refrigerant solution which is lean in refrigerant (i.e., has a lower percentage refrigerant content) is contacted with the refrigerant vapor. As vapor is absorbed into solution, it releases latent heats of condensation and solution thereby boosting the temperature level in the absorber. This boosted heat released by the further absorption of refrigerant vapor into solution can then be utilized to generate high pressure steam in an amount $W_3$ to help meet the process requirements of the plant. As shown in FIG. 1, heat from absorber 42 heats feed water supplied through conduit 43 to make steam which is sent to line 14.

The absorbent-refrigerant solution, now rich in refrigerant (i.e., having a higher percentage refrigerant content) then passes through line 44, solution heat exchanger 46, and lines 48 into first desorber 38. A portion of the rich solution is passed through line 50, solution heat exchanger 52, and line 54 into second desorber 56. Desorber 38 is operated at a somewhat higher temperature and pressure than desorber 56 although both desorbers are maintained at relatively low pressures in comparison to the pressure maintained in the absorber. Expansion valves (not shown) in lines 48 and 50 may be utilized to provide the necessary pressure drop.

In desorber 38, heat is supplied from the steam in line 34 to desorb at least a portion of the refrigerant from solution as a vapor which then passes via line 52 into condenser 54. In condenser 54 the refrigerant is condensed into its pure state, giving up its latent heat of condensation to the fluid in heat exchange loop 58. This heat is then utilized to cause at least a portion of the refrigerant in the absorbent-refrigerant solution in desorber 56 to desorb from solution as vapor and pass via line 60 to condenser 62. In condenser 62 the refrigerant is condensed into its pure state as a liquid, giving up its latent heat of condensation through heat exchange fluid in conduit 64 to an available heat sink. The condensates from condensers 54 and 62 are then transported by pump 66 through line 68 back to evaporator 36 to complete the refrigerant loop. Pump 66 must be selected to provide refrigerant at the relatively high pressure maintained in the evaporator.

The remaining absorbent-refrigerant solutions in desorbers 38 and 56 which are now lean in refrigerant are transported by pumps 70 and 72, respectively, through line 74 to absorber 42. The solution in line 74 passes through recuperative heat exchangers 46 and 53 and receives some of the heat from the hot rich solutions in lines 44 and 50. The heat exchange process minimizes flash vaporization which occurs when the rich solution is throttled to desorber pressure. The heat transferred to the lean solution also minimizes the additional heat necessary to raise its temperature to the temperature level maintained in the absorber.

In many instances, an industrial plant may have a waste heat recovery system. If such heat is available it can be added as steam to the booster system 30 as shown in FIG. 1. Booster system 30 can be readily modulated to adjust to variations in both steam supply and pressure by adjusting the flow of refrigerant and absorbent through the system. Moreover, the system maintains its approach to the ideal coefficient of performance(COP), defined as $$COP = \frac{T_B}{T_I} \times \frac{T_I - T_S}{T_B - T_S},$$

where $T_B$ is the boost temperature, $T_I$ is the temperature supplied to the system, and $T_S$ is the sink temperature, all temperatures in degrees Rankine, as the steam load is varied. This is in sharp contrast to the limited flexibility that an extra turbine stage would have and which could require wetness control.

Figure 2:
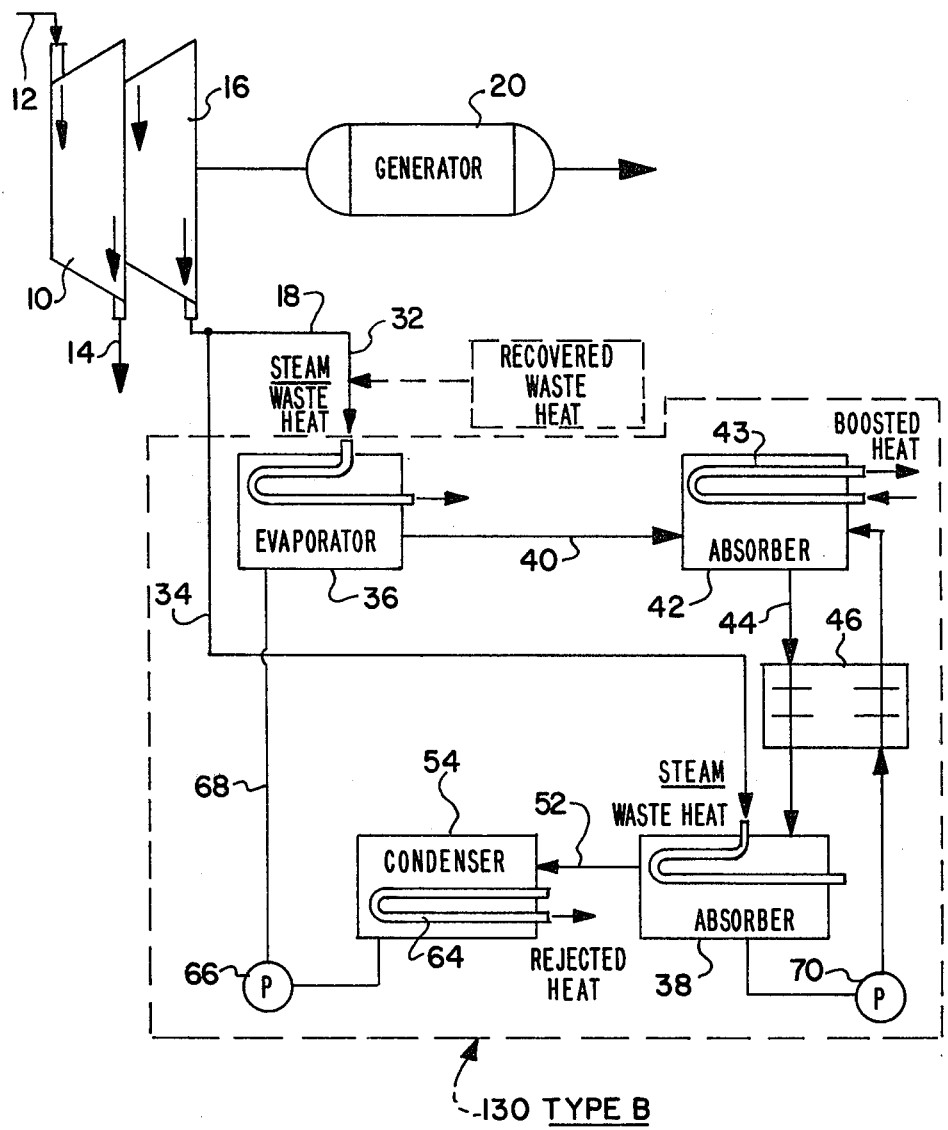
FIG. 2 is also a schematic illustration of another embodiment of the present invention.

In an alternative embodiment of the invention illustrated in FIG. 2 in which the degree of superheat of the partially expanded steam is such that further expansion will not cause turbine wetness problems, the ratio of generated power to process steam use is increased by lowering the extraction pressure at each turbine stage and using this further steam expansion to do more shaft work. In FIG. 2, where like reference numerals represent like components, superheated high pressure steam is supplied to high pressure turbine stage 10 through line 12. Steam at a pressure meeting the low pressure process steam needs of the plant is extracted through line 14 while the remainder of the partially expanded steam enters low pressure turbine stage 16. Very low pressure steam is extracted from turbine stage 16 and is used to supply steam to thermal booster system 130. The shaft work done by the steam expansion in the two turbine stages is used to generate electrical power for the plant in generator 20.

For example, if the high pressure process steam needs of the plant require 165 psia steam and the low pressure process needs require 65 psia steam, then the system illustrated in FIG. 2 can be used to supply these needs while at the same time utilizing the increased amount of steam expansion in the turbines to generate additional power. Low pressure process steam at 65 psia will be extracted from turbine stage 10 while the steam remaining in the turbine is further expanded to 23 psia, for example, and is extracted for use in thermal boost system 130. In thermal boost system 130, which for purposes of this invention will be termed a Type B system, will boost a portion of the 23 psia steam entering the system to 165 psia steam to supply the high pressure process steam needs of the plant at a coefficient of performance of about 0.48.

The basic components of boost system 130 include evaporator 36, absorber 42, desorber 38, and condenser 54. As shown in FIG. 2, evaporator 36 is supplied with steam through line 32 which supplies the heat needed to evaporate refrigerant at a relatively high pressure. Refrigerant vapor then passes via line 40 to absorber 42 which is also maintained at the same relatively high pressure as evaporator 36. In absorber 42 an absorbent-refrigerant solution which is lean in refrigerant is contacted with the refrigerant vapor. As vapor is absorbed into solution, it releases latent heats of condensation and solution thereby boosting the temperature level in the absorber. The boosted heat released by the absorption of refrigerant vapor into solution is then used to heat feed water in conduit 43 to convert it to steam and supply the high pressure process steam requirements of the plant.

The absorbent-refrigerant solution, now rich in refrigerant then passes through line 44 and solution heat exchanger 46 into desorber 38. Desorber 38 is operated at a temperature and pressure lower than that maintained in the absorber. An expansion valve (not shown) in line 44 may be used to provide the necessary pressure drop.

In desorber 38, heat is supplied from the steam in line 34 to desorb at least a portion of the refrigerant from solution as a vapor which then passes via line 52 into condenser 54. In condenser 54 the refrigerant is condensed into its pure state as a liquid, giving up its latent heat of condensation through heat exchange fluid in conduit 64 to an available heat sink. Condensate is then transported by pump 66 through line 68 back to evaporator 36 to complete the refrigerant loop.

The remaining absorbent-refrigerant solution in desorber 38, which is now lean in refrigerant, is transported by pump 70 through line 74 and recuperative heat exchanger 46 to absorber 42. As discussed above, if there is a waste heat recovery system in the plant, that heat can be supplied as steam to booster system 130 as shown in FIG. 2.

In yet another embodiment of the invention, a bottoming turbine may be added to the system to increase power generation and restore full steam flow to the low pressure turbine stage when process steam requirements in the plant have been reduced. As illustrated in FIG. 3, very high pressure steam from fueled boilers enters high pressure turbine stage 10 through line 12. High pressure steam is extracted from the turbine stage through line 14 and is used to supply a portion of the plant's high pressure steam requirements. Low pressure steam is extracted from low pressure turbine stage 16 through line 18. The low pressure steam in excess of process steam demand is admitted into bottoming turbine 100 via line 102 and control valve 104. Expansion of the steam produces shaft work which runs electrical generator 120.

Very low pressure steam is exhausted from bottoming turbine 100 through line 106 into thermal boost system 130. As explained above, a portion of this very low pressure steam is converted by the thermal booster into high pressure steam which exits from the booster through line 108 and is combined with the steam in line 14 to supply the high pressure process steam requirements of the plant. Against, recovered waste heat can be supplied as steam to the boost system as shown in FIG. 3. Alternatively, a Type A boost system may be substituted for boost system 130 and be used to produce a portion of the low pressure process steam requirements for the plant.

In still another embodiment of the invention the components of the system are arranged so that power generation and the production of high and low pressure process steam can all be independently controlled to meet varying requirements. As illustrated in FIG. 4, very high pressure steam from the fueled boilers enters high pressure turbine stage 10 through line 12. High pressure steam is extracted from turbine stage 10 through line 14. A portion of that steam is admitted into bottoming turbine 100 through control valve 104 while the remainder of the steam is sent through line 110 to meet the high pressure process steam requirements of the plant.

Low pressure steam is extracted from low pressure turbine stage 16 through line 18 and is sent to meet the low pressure process steam needs of the plant. A portion of the steam in line 18 can be diverted to boost system 30 through control valve 112. Boost system 30 acts to convert a portion of the low pressure steam to high pressure steam which is added to the high pressure steam in line 110 through line 114.

The very low pressure steam leaving bottoming turbine 100 is optionally combined with any steam from waste heat recovery systems within the plant and is sent through line 116 to boost system 130. Boost system 130 acts to convert a portion of the very low pressure steam into high pressure process steam which is added to steam in line 110 through line 118. Power is generated in generators 20 and 120 by the expansion of the steam in the turbines.

In this manner, efficient control of power and steam outputs is achieved. For example, in a cogeneration system which requires an amount $W_1$ of high pressure process steam and an amount $W_2$ low pressure process steam, the Type B and Type A boost systems can contribute amounts $W_3$ and $W_4$ of high pressure process steam, respectively. This permits excess high pressure steam from the high pressure turbine stage to be further expanded in the bottoming turbine to provide more power generation. Moreover, full steam flow can be maintained through the low pressure turbine stage by diverting excess low pressure steam extracted from that stage to the Type A booster.

Thus, control of the low pressure process steam is achieved by varying the solution pump flows in the Type A booster in response to varying demands for steam. For example, if the low pressure process demand is decreased, back pressure on the turbines is increased and the solution pump flows in the booster are increased to relieve back pressure and restore full steam flow. The output of power is regulated by the amount of steam entering the bottoming turbine. High pressure process steam demand is controlled by varying the admission of steam to the high pressure turbine stage.

Of course, many other possible control configurations of a cogeneration system using thermal boosting systems will be apparent to those skilled in the art. While the examples and systems discussed have been directed to a cogeneration system having a high and a low process steam demand, it is within the scope of the present invention to provide a flexible control system for cogeneration systems having from one to a multiple number of different process steam demands. Moreover, it is within the scope of the present invention to combine the waste heat recovery systems disclosed and claimed in commonly assigned copending U.S. applications Ser. Nos. 139,051, filed Apr. 10, 1980, now abandoned, and 177,663, filed Aug. 13, 1980, now U.S. Pat. No. 4,333,515 with the cogeneration system of the present invention. Finally, where high quality boiler steam is available, open cycle thermal boosting systems such as those disclosed in commonly assigned copending U.S. Ser. No. 177,660, filed Aug. 13, 1980, now U.S. Pat. No. 4,338,268 can be used in the practice of the present invention.

What is claimed is:

1. A steam and electrical power cogeneration system for an industrial plant comprising in combination:
    (a) means for generating electrical power from steam, said means including a source of steam and a turbine having at least one high pressure extraction stage and at least one lower back-pressure stage,
    (b) means for extracting steam from said at least one high pressure stage to supply high pressure process steam needs for said plant,
    (c) means for discharging steam from said at least one back-pressure stage to supply low pressure process steam needs for said plant, and
    (d) means for boosting low pressure steam to a higher pressure and temperature to supply a portion of said high pressure process steam needs for said plant, said boosting means requiring a source of heat for operation, said source of heat provided by heat energy from a portion of said low pressure steam from said back-pressure stage.

2. The system of claim 1 including means for supplying recovered waste heat from within said plant as low pressure steam to provide additional heat to operate said boosting means.

3. The system of claims 1 or 2 in which said boosting means comprises means for evaporating refrigerant at a relatively high pressure including means for supplying heat to said evaporating means utilizing said low pressure steam, means for contacting the refrigerant vapor produced in the evaporation means with a liquid solution of said refrigerant and an absorbent to absorb at least a portion of said vapor whereby heat is given off, means in heat exchange communication with said contacting means for transferring said heat to a source of feed water to provide high pressure steam, first means for desorbing at least a portion of said refrigerant in said absorbent-refrigerant solution at a relatively low pressure including means for supplying heat to said first desorbing means utilizing said low pressure steam, first means for condensing at least a portion of the refrigerant desorbed by said first desorbing means, second means for desorbing at least a portion of said refrigerant in said absorbent-refrigerant solution at a relatively low pressure lower than the pressure maintained in said first desorbing means, said second desorbing means being in heat exchange communication with said first condensing means, second means for condensing at least a portion of the refrigerant desorbed by said second desorbing means, and conduit means connecting said evaporating means with said contacting means, said contacting means with said first and second desorbing means, said first desorbing means with said first condensing means, said second desorbing means with said second condensing means, and said first and second condensing means with said evaporating means.

4. The system of claim 3 including means for recycling said liquid solution from said first and second desorbing means to said contacting means.

5. The system of claim 4 including means for exchanging heat between said recycle means and said conduit means connecting said contacting means with said first and second desorbing means.

6. A steam and electrical power cogeneration system for an industrial plant comprising in combination:
 (a) means for generating electrical power from steam, said means including a source of steam and a turbine having a first extraction stage and a second back-pressure stage,
 (b) means for extracting steam from said first stage to supply low pressure of process steam needs for said plant, and
 (c) means for boosting low pressure steam to a higher pressure and temperature to supply the high pressure process steam needs for said plant, said boosting means requiring a source of heat for operation, said source of heat provided by heat energy from a portion of said low pressure steam from said second back-pressure stage.

7. The system of claim 6 including means for supplying recovered waste heat from within said plant as steam to provide additional heat to operate said boosting means.

8. The system of claims 6 or 7 in which said boosting means comprises means for evaporating refrigerant at a relatively high pressure including means for supplying heat to said evaporating means utilizing said steam from said second stage, means for contacting the refrigerant vapor produced in the evaporation means with a liquid solution of said refrigerant and an absorbent to absorb at least a portion of said vapor whereby heat is given off, means in heat exchange communication with said contacting means for transferring said heat to a source of feed water to provide high pressure steam, means for desorbing at least a portion of said refrigerant in said absorbent-refrigerant solution at a relatively low pressure including means for supplying heat to said desorbing means utilizing said steam from said second stage, means for condensing at least a portion of the refrigerant desorbed by said desorbing means, and conduit means connecting said evaporating means with said contacting means, said contacting means with said desorbing means, said desorbing means with said condensing means, and said condensing means with said evaporating means.

9. The system of claim 8 including means for recycling said liquid solution from said desorbing means to said contacting means.

10. The system of claim 9 including means for exchanging heat between said recycle means and said conduit means connecting said contacting means with said desorbing means.

11. A steam and electrical power cogeneration system for an industrial plant comprising in combination:
 (a) first means for generating electrical power from steam, said means including a source of steam and a turbine having a first extraction stage and a second back-pressure stage,
 (b) means for extracting steam from said first stage to supply high pressure process steam needs for said plant,
 (c) means for discharging steam from said second stage to supply low pressure process steam needs for said plant,
 (d) second means for generating electrical power, said means including a bottoming turbine and means connecting said bottoming turbine to said means for discharging steam from said second stage as a source of steam for said bottoming turbine, and
 (e) means for boosting low pressure steam to a higher pressure and temperature to supply a portion of the high pressure process steam needs for said plant, said boosting means requiring a source of heat for operation, said source of heat provided by heat energy from a portion of said steam from said bottoming turbine.

12. The system of claim 11 including means to control the amount of low pressure process steam supplied to said bottoming turbine.

13. The system of claim 11 including means for supplying recovered waste heat from within said plant as steam to provide additional heat to operate said boosting means.

14. The system of claim 11 in which said boosting means comprises means for evaporating refrigerant at a relatively high pressure including means for supplying heat to said evaporating means utilizing said steam from said second stage, means for contacting the refrigerant vapor produced in the evaporation means with a liquid solution of said refrigerant and an absorbent to absorb at least a portion of said vapor whereby heat is given off, means in heat exchange communication with said contacting means for transferring said heat to a source of feed water to provide high pressure steam, means for desorbing at least a portion of said refrigerant in said absorbent-refrigerant solution at a relatively low pressure including means for supplying heat to said desorbing means utilizing said steam from said second stage, means for condensing at least a portion of the refrigerant desorbed by said desorbing means, and conduit means connecting said evaporating means with said contacting means, said contacting means with said desorbing means, said desorbing means with said condensing means, and said condensing means with said evaporating means.

15. The system of claim 14 including means for recycling said liquid solution from said desorbing means to said contacting means.

16. The system of claim 15 including means for exchanging heat between said recycle means and said conduit means connecting said contacting means with said desorbing means.

17. A steam and electrical cogeneration system for an industrial plant comprising in combination:
 (a) first means for generating electrical power from steam, said means including a source of steam and a turbine having a first extraction stage and a second back-pressure stage, (b) means for extracting steam from said first stage to supply high pressure process steam needs for said plant, (c) means for discharging steam from said second stage to supply low pressure process steam needs for said plant, (d) first means for boosting steam to a higher pressure and temperature to supply a portion of the high pressure process steam needs for said plant, said first boosting means requiring a source of heat for operation, said source of heat provided by heat energy from a portion of said steam from said second back-pressure stage, (e) second means for generating electrical power, said means including a bottoming turbine and means connecting said bottoming turbine to said means for extracting steam from said first stage as a source of steam for said bottoming turbine, and (f) second means for boosting steam to a higher pressure and temperature to supply a portion of the high pressure process steam needs for said plant, said second boosting means requiring a source of heat for operation, said source of heat provided by heat energy from said steam from said bottoming turbine.

18. The system of claim 17 including means to control the amount of steam supplied to said first boosting means and means to control the amount of steam supplied to said bottoming turbine.

19. The system of claim 17 including means for supplying recovered waste heat from within said plant as steam to provide additional heat to operate said second boosting means.

20. The system of claim 17 in which said first boosting means comprises means for evaporating refrigerant at a relatively high pressure including means for supplying heat to said evaporating means utilizing steam from said second stage, means for contacting the refrigerant vapor produced in the evaporation means with a liquid solution of said refrigerant and an absorbent to absorb at least a portion of said vapor whereby heat is given off, means in heat exchange communication with said contacting means for transferring said heat to a source of feed water to provide high pressure steam, first means for desorbing at least a portion of said refrigerant in absorbent-refrigerant solution at a relatively low pressure including means for supplying heat to said first desorbing means utilizing steam from said second stage, first means for condensing at least a portion of the refrigerant desorbed by said first desorbing means, second means for desorbing at least a portion of said refrigerant in said absorbent-refrigerant solution at a relatively low pressure lower than the pressure maintained in said first desorbing means, said second desorbing means being in heat exchange communication with said first condensing means, and second means for condensing at least a portion of the refrigerant desorbed by said second desorbing means, and conduit means connecting said evaporating means with said contacting means, said contacting means with said first and second desorbing means, said first desorbing means with said first condensing means, said second desorbing means with said second condensing means, and said first and second condensing means with said evaporating means.

21. The system of claim 20 including means for recycling said liquid solution from said first and second desorbing means to said contacting means.

22. The system of claim 21 including means for exchanging heat between said recycle means and said conduit means connecting said contacting means with said first and second desorbing means.

23. The system of claim 17 in which said first boosting means comprises means for evaporating refrigerant at a relatively high pressure including means for supplying heat to said evaporating means utilizing said steam from said second stage, means for contacting the refrigerant vapor produced in the evaporation means with a liquid solution of said refrigerant and an absorbent to absorb at least a portion of said vapor whereby heat is given off, means in heat exchange communication with said contacting means for transferring said heat to a source of feed water to provide high pressure steam, means for desorbing at least a portion of said refrigerant in said absorbent-refrigerant solution at a relatively low pressure including means for supplying heat to said desorbing means utilizing said steam from said second stage, means for condensing at least a portion of the refrigerant desorbed by said desorbing means, and conduit means connecting said evaporating means with said contacting means, said contacting means with said desorbing means, said desorbing means with said condensing means, and said condensing means with said evaporating means.

24. The system of claim 23 including means for recycling said liquid solution from said vaporizing means to said contacting means.

25. The system of claim 24 including means for exchanging heat between said recycle means and said conduit means connecting said contacting means with said desorbing means.

* * * * *